United States Patent
Beique et al.

(10) Patent No.: US 7,932,834 B2
(45) Date of Patent: *Apr. 26, 2011

(54) DATA RELAY SYSTEM FOR INSTRUMENT AND CONTROLLER ATTACHED TO A DRILL STRING

(75) Inventors: Jean Michel Beique, Rockwall, TX (US); Morris Benjamin Robbins, Mandeville, LA (US)

(73) Assignee: Halliburton Energy Services. Inc., Houston, TX (US)

( * ) Notice: Subject to any disclaimer, the term of this patent is extended or adjusted under 35 U.S.C. 154(b) by 1120 days.

This patent is subject to a terminal disclaimer.

(21) Appl. No.: 11/701,323

(22) Filed: Feb. 1, 2007

(65) Prior Publication Data

US 2007/0132605 A1 Jun. 14, 2007

Related U.S. Application Data

(62) Division of application No. 10/167,737, filed on Jun. 11, 2002, now Pat. No. 7,173,542, which is a division of application No. 09/255,612, filed on Feb. 19, 1999, now Pat. No. 6,429,784.

(51) Int. Cl.
*G01V 3/00* (2006.01)
(52) U.S. Cl. ....... 340/854.4; 175/40; 367/82; 340/854.6
(58) Field of Classification Search ............... 340/853.2, 340/854.4, 854.6; 166/250.11, 250.01, 254.1; 73/152.52; 175/40; 367/82
See application file for complete search history.

(56) References Cited

U.S. PATENT DOCUMENTS

| | | | |
|---|---|---|---|
| 2,620,386 A | 12/1952 | Alspaugh et al. | |
| 3,188,607 A | 6/1965 | Woodworth | |
| 3,243,722 A | 3/1966 | Billings | |
| 3,337,992 A | 8/1967 | Tolson | |
| 3,363,118 A | 1/1968 | Sims | |
| 4,072,923 A | 2/1978 | Siems et al. | |
| 4,207,619 A | 6/1980 | Klaveness | |
| 4,319,345 A | 3/1982 | Dennis | |
| 4,475,591 A | 10/1984 | Cooke, Jr. | |
| 4,594,691 A | 6/1986 | Kimball et al. | |
| 4,649,525 A | 3/1987 | Angona et al. | |
| 4,665,511 A | 5/1987 | Rodney et al. | |
| 4,698,791 A | 10/1987 | Cunningham | |
| 4,724,434 A | 2/1988 | Hanson et al. | |
| 4,775,009 A * | 10/1988 | Wittrisch et al. | ........ 166/250.11 |

(Continued)

FOREIGN PATENT DOCUMENTS

CA 1166148 4/1984

(Continued)

OTHER PUBLICATIONS

European Search Report issued in International Application No. EP 08 01 0139, mailed Jul. 22, 2009, 5 pages.

(Continued)

*Primary Examiner* — Albert K Wong
(74) *Attorney, Agent, or Firm* — Fish & Richardson P.C.

(57) ABSTRACT

A casing sensor and methods for sensing using a casing sensor are disclosed. The casing sensor includes a casing shoe and a sensor coupled to the casing shoe. A casing data relay includes a downhole receiver coupled to a well casing and a transmitter coupled to the receiver. The casing sensor may be coupled to the transmitter. A drill string actuator may be controllable through the downhole receiver.

12 Claims, 8 Drawing Sheets

U.S. PATENT DOCUMENTS

| | | | |
|---|---|---|---|
| 4,796,237 | A | 1/1989 | Hutchens et al. |
| 4,825,117 | A | 4/1989 | Thomas, III et al. |
| 4,832,148 | A | 5/1989 | Becker et al. |
| 4,839,644 | A | 6/1989 | Safinya et al. |
| 4,845,616 | A | 7/1989 | Phillips |
| 4,872,526 | A | 10/1989 | Wignall et al. |
| 4,899,844 | A | 2/1990 | Katahara et al. |
| 4,951,267 | A | 8/1990 | Chang et al. |
| 5,004,048 | A | 4/1991 | Bode |
| 5,027,331 | A | 6/1991 | Winbow et al. |
| 5,044,461 | A | 9/1991 | Aronstam |
| RE33,751 | E | 11/1991 | Geczy et al. |
| 5,063,542 | A | 11/1991 | Petermann et al. |
| 5,080,182 | A | 1/1992 | Thompson |
| 5,131,477 | A | 7/1992 | Stagg et al. |
| 5,148,407 | A | 9/1992 | Haldorsen et al. |
| 5,163,521 | A | 11/1992 | Pustanyk et al. |
| 5,191,557 | A | 3/1993 | Rector et al. |
| 5,243,562 | A | 9/1993 | Laurent et al. |
| 5,265,680 | A | 11/1993 | Withers et al. |
| 5,282,384 | A | 2/1994 | Holbrook |
| 5,348,093 | A | 9/1994 | Wood et al. |
| 5,357,481 | A | 10/1994 | Lester et al. |
| 5,363,094 | A | 11/1994 | Staron et al. |
| 5,377,160 | A | 12/1994 | Tello et al. |
| 5,387,767 | A | 2/1995 | Aron et al. |
| 5,409,071 | A | 4/1995 | Wellington et al. |
| 5,415,037 | A | 5/1995 | Griston et al. |
| 5,467,823 | A | 11/1995 | Babour et al. |
| 5,475,309 | A | 12/1995 | Hong et al. |
| 5,475,650 | A | 12/1995 | Sinha et al. |
| 5,509,474 | A | 4/1996 | Cooke, Jr. |
| 5,510,582 | A | 4/1996 | Birchak et al. |
| 5,524,709 | A | 6/1996 | Withers |
| 5,597,042 | A | 1/1997 | Tubel et al. |
| 5,644,186 | A | 7/1997 | Birchak et al. |
| 5,662,165 | A | 9/1997 | Tubel et al. |
| 5,678,643 | A | 10/1997 | Robbins et al. |
| 5,712,829 | A | 1/1998 | Tang et al. |
| 5,720,355 | A | 2/1998 | Lamine et al. |
| 5,732,776 | A | 3/1998 | Tubel et al. |
| 5,796,677 | A | 8/1998 | Kostek et al. |
| 5,829,520 | A * | 11/1998 | Johnson ............... 166/250.01 |
| 5,831,549 | A | 11/1998 | Gearhart |
| 5,852,262 | A | 12/1998 | Gill et al. |
| 5,868,201 | A | 2/1999 | Bussear et al. |
| 5,914,911 | A | 6/1999 | Babour et al. |
| 5,941,307 | A | 8/1999 | Tubel |
| 5,959,547 | A * | 9/1999 | Tubel et al. ............. 340/853.2 |
| 5,967,816 | A | 10/1999 | Sampa et al. |
| 6,018,301 | A | 1/2000 | Smith |
| 6,053,245 | A | 4/2000 | Haberman |
| 6,055,213 | A | 4/2000 | Rubbo et al. |
| 6,075,461 | A | 6/2000 | Smith |
| 6,079,505 | A | 6/2000 | Pignard et al. |
| 6,082,451 | A | 7/2000 | Giroux et al. |
| 6,119,777 | A | 9/2000 | Runia |
| 6,131,658 | A * | 10/2000 | Minear .................. 166/250.01 |
| 6,138,752 | A * | 10/2000 | Bass et al. ............. 166/250.01 |
| 6,138,774 | A | 10/2000 | Bourgoyne |
| 6,144,316 | A | 11/2000 | Skinner |
| 6,148,912 | A | 11/2000 | Ward |
| 6,150,822 | A | 11/2000 | Hong et al. |
| 6,166,994 | A | 12/2000 | Jeffryes |
| 6,176,344 | B1 | 1/2001 | Lester |
| 6,189,612 | B1 | 2/2001 | Ward |
| 6,196,316 | B1 | 3/2001 | Bosma et al. |
| 6,213,250 | B1 | 4/2001 | Wisniewski et al. |
| 6,218,959 | B1 | 4/2001 | Smith |
| 6,257,354 | B1 | 7/2001 | Schrader et al. |
| 6,262,941 | B1 | 7/2001 | Naville |
| 6,279,392 | B1 * | 8/2001 | Shahin et al. ............. 73/152.52 |
| 6,366,531 | B1 | 4/2002 | Varsamis et al. |
| 6,374,913 | B1 * | 4/2002 | Robbins et al. ................ 166/66 |
| 6,392,561 | B1 | 5/2002 | Davies et al. |
| 6,408,943 | B1 | 6/2002 | Schultz et al. |
| 6,426,917 | B1 | 7/2002 | Tabanou et al. |
| 6,427,785 | B2 | 8/2002 | Ward |
| 6,429,784 | B1 | 8/2002 | Beique et al. |
| 6,442,105 | B1 | 8/2002 | Tubel et al. |
| 6,466,513 | B1 | 10/2002 | Pabon et al. |
| 6,480,118 | B1 | 11/2002 | Rao |
| 6,538,576 | B1 | 3/2003 | Schultz et al. |
| 6,588,517 | B2 | 7/2003 | Baird |
| 6,622,803 | B2 | 9/2003 | Harvey et al. |
| 6,624,759 | B2 | 9/2003 | Tubel et al. |
| 6,661,737 | B2 | 12/2003 | Wisniewski et al. |
| 6,837,332 | B1 | 1/2005 | Rodney |

FOREIGN PATENT DOCUMENTS

| | | |
|---|---|---|
| DE | 3504011 | 8/1986 |
| EP | 0317386 A2 | 5/1989 |
| EP | 0388316 A2 | 9/1990 |
| EP | 0552833 A1 | 7/1993 |
| EP | 0679910 A2 | 2/1995 |
| EP | 0660136 A2 | 6/1995 |
| EP | 0671547 A1 | 9/1995 |
| EP | 0747732 A2 | 12/1996 |
| EP | 0778473 A2 | 6/1997 |
| FR | 2138336 | 5/1971 |
| FR | 2 593 292 | 7/1987 |
| FR | 2 600 172 | 12/1987 |
| FR | 2199595 | 9/1992 |
| FR | 2682715 A1 | 4/1993 |
| GB | 1534854 | 12/1978 |
| GB | 2071847 | 9/1981 |
| GB | 2165356 | 4/1986 |
| GB | 2266372 | 3/1993 |
| GB | 2273984 | 7/1994 |
| GB | 2276723 | 10/1994 |
| GB | 2282664 | 4/1995 |
| WO | WO 92/02833 | 2/1992 |
| WO | WO 93/07514 | 4/1993 |
| WO | WO 93/15421 | 8/1993 |
| WO | WO 94/10587 | 5/1994 |
| WO | WO 95/14845 | 6/1995 |
| WO | WO 96/18118 | 6/1996 |
| WO | WO 97/27502 | 7/1997 |
| WO | WO 97/49894 | 12/1997 |
| WO | WO 98/05981 | 2/1998 |
| WO | WO 98/12417 | 3/1998 |
| WO | WO 98/50680 | 11/1998 |
| WO | WO 00/00846 | 1/2000 |

OTHER PUBLICATIONS

Anderson, Herbert L., (Editor in Chief), A Physicist's Desk Reference, The Second Edition of Physics Vade Mecum, American Institute of Physics, New York City, NY, 1989, Chapter 2.00.

Aron, J. et al., "Sonic Compressional Measurements While Drilling," SPWLA 35th Annual Logging Symposium, Jun. 19-22, 1994, pp. 1-17.

Block, L.V. et al., "Velocity analysis of multi-receiver full-waveform acoustic-logging data in open and cased holes," Log Analyst, May-Jun. 1991, pp. 188-200.

Bobber, R.J., "General Reciprocity Parameter," Journal of Acoustical Society of America, vol. 39, No. 4, (1966), pp. 680-687.

Booer, A.K. et al., "Drillstring Imaging-An Interpretation of Surface Drilling Vibrations," SPE Drilling & Completion, Jun. 1993, pp. 93-98.

Cheng, C.H. et al., "Determination of in situ attenuation from full waveform acoustic logs," Journal of Geophysical Research, vol. 87, No. B7, Jul. 10, 1982, pp. 5477-5484.

Cheng, C.H. et al., "Elastic wave propagation in a fluid-filled borehole and synthetic acoustic logs," Geophysics, vol. 46, No. 7 (Jul. 1981), pp. 1042-1053.

Chudy, S. et al., "Cased Hole Acoustic Logging—A Solution to a Problem," SPWLA 36th Annual Logging Symposium, 26-29, 1995, Paper I.

Cook, C.E. et al. "Field Measurements of Annular Pressure and Temperature During Primary Cementing," Journal of Petroleum Technology, Dallas, Texas, Aug. 1, 1983, pp. 1429-1438.

Douze, E.J. et al., "Statistics of Semblance," Geophysics, vol. 44, No. 12 (Dec. 1979), pp. 1999-2003.

Esmersoy, C. et al., "Fracture and Stress Evaluation Using Dipole-Shear Anisotropy Logs," SPWLA 36th Annual Logging Symposium, Jun. 26-29, 1995, Paper J, pp. 1-12.

European Search Report for EP Application No. 03076220.7 mailed Apr. 18, 2006, 3 pages.

European Search Report for EP Application No. 03076223.1 mailed Apr. 24, 2006, 3 pages.

Gelchinsky, B., "Automatic picking of first arrivals and parametrization of traveltime curves," Geophysical Prospecting 31, 1983, pp. 915-925.

Goetz, J.F. et al., "An Investigation into Discrepancies between Sonic Log and Seismic Check Spot Velocities," Journal of Australian Petroleum Exploration Association, 1979, pp. 131-141.

Harrison, A.R. et al., "Acquisition and analysis of sonic waveforms from a borehole mompole and dipole source for the determination of compressional and shear speeds and their relation to rock mechanical properties and surface seismic data," SPE 20577 (65th Annual Technical Conference and Exhibition, New Orleans, 1990), pp. 267-282.

Jackson, et al. "Seismic While Drilling: Operational Experiences in Vietnam," World Oil, Mar. 1997, pp. 50-53.

Kamata et al., Real-time Seismic-While-Drilling Offers Savings, Improves Safety, Hart's Petroleum Eng'r Int'l, Oct. 1997, pp. 37-39.

Kanasewich, E.R. et al., "Nth root stack nonlinear multichannel filter," Geophysics, vol. 38, No. 2 (Apr. 1973), pp. 327-338.

Khaled et al., "Seismic-While-Drilling in Kuwait Results and Applications," GeoArabia, vol. 1, No. 4, 1996, Gulf PetroLink, Bahrain, pp. 531-550.

Kimball, C. et al., "Semblance processing of borehole acoustic array data," Geophysics vol. 49, No. 3 (Mar. 1984), pp. 274-281.

Kokesh, F.P. et al., "A new approach to sonic logging and other acoustic measurements," SPE 30th Annual Fall Meeting, Houston, 1964.

Kurkjian, A.L. et al., "Slowness estimation from sonic logging waveforms," Geoexploration 27 (1991), pp. 215-256.

Mari, J.L. et al., "An artificial intelligence approach for the pickling of waves on full-waveform acoustic data," Proceedings of the Conference on Artificial Intelligence in Petroleum Exploration and Production, Houston, Texas 1992, pp. 211-219.

Mari, J.L. et al., "Slowness and Delay in Acoustic Logging," SPWLA 36th Annual Logging Symposium, Jun. 26-29, 1995, pp. 1-11.

McFadden, P.L. et al., "The nth-root stack: Theory applications, and examples," Geophysics, vol. 51, No. 10 (Oct. 1986), pp. 1879-1892.

Meehan, Richard et al., "Rekindling Interest in Seismic While Drilling," Oilfield Review, Jan. 1993, pp. 4-13.

Minear, J. et al., "Compressional Slowness Measurements While Drilling," SPWLA 36th Annual Logging Symposium, Jun. 26-29, 1995, Article VV, pp. 1-12.

Minear, John W., "Full Wave sonic logging: a brief perspective," SPWLA 27th Annual Logging Symposium, Jun. 9-13, 1986, paper AAA, pp. 1-21.

Miranda et al., "Impact of the Seismic 'While Drilling' Technique on Exploration Wells," First Break, vol. 14, No. 2, Feb. 1996, pp. 55-68.

Morris C.F. et al., "A new sonic array tool for full waveform logging," SPE 13285 (59th Annual Technical Conference and Exhibition, Houston, 1984.).

Nakkan, E. et al., "Characteristics of Drill Bit generated noise," SPWLA 31st Annual Logging Symposium, Jun. 24-27, 1990. Paper X, pp. 1-11.

Naville et al., "Well-Seismic-Application of the TRAFOR MWD System to the Drill Bit Seismic Profiling," EAEG-56th Meeting and Technical Exhibition, Vienna, Jun. 1994.

Paillet, F.K., "Predicting the frequency content of acoustic waveforms obtained in boreholes," SPWLA 22nd Annual Logging Symposium, Jun. 23-26, 1981, paper SS, pp. 1-29.

Peterson, E.W., "Acoustic wave propagation along a fluid-filled cylinder," Journal of Applied Physics, vol. 45, No. 8 (Aug. 1974), pp. 3340-3350.

Poletto, Flavio et al., "Seismic While Drilling Using PDC Signals-Seisbit Experience and Perspectives," EAEG 59th Conference and Technical Exhibition-Geneva, Switzerland, May 26-30, 1997, p. 2.

Rector, J.W., III et al., "The Use of Drill-Bit Energy as Downhole Seismic Source," Geophysics, vol. 56, No. 5, May 1991, pp. 628-634.

Rector, James, "Noise Characterization and Attenuation in Drill Bit Recordings," Journal of Seismic Exploration, 1992, pp. 379-393.

Rector, James, III et al., "Radiation Pattern Seismic Waves Generated by a Working Roller-Cone Drill Bit," Geophysics, vol. 57, No. 10, Oct. 1992, pp. 1319-1333.

Smith, M.L. et al., "The Amoco array sonic logger," The Log Analyist, May-Jun. 1991, pp. 201-214.

Ulrych et al., "Analytic Minimum Entropy Deconvolution," Geophysics, vol. 47, No. 9, Sep. 1982.

Ulrych et al., "Autoregressive Recovery of the Acoustic Impedance," Geophysics, vol. 48, No. 10, Oct. 1983.

Western Production Company website, www.westernproduction.com, "The Drilling Site," pp. 1-2, "Plug or Complete," pp. 1-2, and "Producing Oil and Gas," pp. 1-2, Oct. 8, 1998.

Williams, D.M. et al., "The Long Spaced Acoustic Logging Tool," SPWLA 25th Annual Logging Symposium, Jun. 10-13, 1984, pp. 1-16.

Willis, M.E. et al., "Automatic P and S velocity determination from full waveform digital acoustic logs," Geophysics, vol. 48, No. 12 (Dec. 1983), pp. 1631-1644.

Zemanek, J. et al., Continuous Acoustic Shear Wave Logging, SPWLA 25th Annual Logging Symposium, Jun. 10-13, 1984, pp. 1-14.

Communication pursuant to Article 94(3) EPC, issued in International Application No. EP 08 010 139.7-2315, mailed Jul. 6, 2010, 33 pages.

* cited by examiner

DATA RELAY SYSTEM FOR INSTRUMENT AND CONTROLLER ATTACHED TO A DRILL STRING

This application is a divisional (and claims the benefit of priority under U.S.C. §120) of application Ser. No. 10/167,737, filed Jun. 11, 2002 now U.S. Pat. No. 7,173,542, which is a divisional of application Ser. No. 09/255,612, filed Feb. 19, 1999, now U.S. Pat. No. 6,429,784. The disclosure of the prior application is considered part of (and is incorporated by reference) the disclosure of this application.

FIELD OF THE INVENTION

This invention relates generally to a method and apparatus for collecting data regarding geological properties of underground or undersea formations in the vicinity of a well bore under construction. More particularly, this invention relates to a method and apparatus for collecting data regarding the formations during and after drilling and constructing the well bore. In particular, the invention relates to a method and apparatus for collecting data regarding the formations sensors, actuators and generators coupled to a well casing inside the well bore. This invention also relates to a method and apparatus for relaying data collected deep in a well to the surface.

BACKGROUND OF THE INVENTION

Geologists and geophysicists collect data regarding underground formations in order to predict the location of hydrocarbons such as oil and gas. Traditionally, such information is gathered during an exploration phase. In recent years, however, the art has advanced to allow the collection of geophysical and geological data as a well is being drilled.

For example, in Vertical Seismic Profiling ("VSP"), drilling operations are interrupted to place a series of seismic sensors at discrete depths in a borehole. A surface source releases energy that is reflected off underground geological formations. The seismic sensors in the borehole sense the reflected energy and provide signals representing reflections to the surface for analysis.

In a subsequent development, known as "drill bit seismic", seismic sensors are positioned at the surface near the borehole to sense seismic energy imparted to the earth by the drill bit during drilling. This sensed energy is used in the traditional seismic way to detect reflections from underground geological formations. Further, this technique is used to detect "shadows", or reduced seismic energy magnitude, caused by underground formations, such as gas reservoirs, between the drill bit and the surface sensors.

A greatly simplified description of those steps involved in drilling an oil well follows. A portion of the oil well is drilled using a drill string consisting of drill pipe, drill collars and drill bit. After a portion of the well has been drilled, a section of casing, or large bore pipe, is inserted into the well bore and cemented for, among other things, zonal isolation. Casing performs a number of functions, including: preventing the bore hole from caving in; preventing fluids in the bore hole from contaminating the surrounding formations; preventing the introduction of water into the surrounding formations; containing any production from the well; facilitating pressure control; providing an environment for the installation of production equipment; and providing zonal isolation.

When the casing is in place it is cemented to the formation wall. This is accomplished by pumping cement through the casing until it exits at the end of the casing through a special section of casing called a "casing shoe" and flows up the annulus between the casing and the wall of the well bore. The concrete is then allowed to set.

In subsequent drilling operations, the deep end of the newly cemented casing is drilled out and another section of the well bore is drilled. The process of drilling sections of the well bore followed by inserting and cementing well casing repeats until the desired well depth is reached.

As the well bore is being drilled, drilling fluids, known as "mud", are pumped into the drill string. The mud travels down the drill string until it is ejected. The mud picks up cuttings and carries them to the surface. The specific gravity of the drill mud is carefully controlled so that the weight of the column of mud is (1) large enough to prevent gas or other hydrocarbons from entering the borehole from the surrounding formations; (2) without exerting so much pressure that the surrounding formations are damaged.

After each section of casing is laid and cemented in, the fracture pressure of the formation just below the end of the casing is measured. Generally, the fracture pressure of deeper formations is greater than the fracture pressure of shallower formations. The specific gravity of the drilling mud is subsequently controlled to make sure that the pressure on the formation at the end of the casing does not exceed the fracture pressure of the formation at that point. This is generally accomplished by calculations incorporating the measured specific gravity of the drilling mud and the depth of the column of drilling mud above the formation.

Downhole data are captured using "wireline" techniques in which, prior to casing being laid, a tool, such as an acoustic logging tool, is lowered into the well bore and slowly retrieved, gathering data and storing it or transmitting it to the surface as the tool is being retrieved. Alternatively, measurement while drilling ("MWD") or logging while drilling ("LWD") tools are attached to the drill string just above the drill bit and drill collars. These generally expensive tools gather data during the drilling process and store it or transmit it to the surface.

SUMMARY OF THE INVENTION

In general, in one aspect, the invention features a casing sensor comprising a casing shoe and a sensor coupled to the casing shoe.

Implementations of the invention may include one or more of the following. The sensor may comprise a pressure sensor. The sensor pressure may comprise a pressure transducer and a transmitter coupled to the pressure transducer. The casing sensor may comprise a surface receiver coupled to the transmitter. The casing sensor may comprise a drill string through the casing shoe.

In general, in another aspect, the invention features a casing data relay comprising a downhole receiver coupled to a well casing and a transmitter coupled to the receiver.

Implementations of the invention may include one or more of the following. The casing data relay may comprise a surface receiver coupled to the transmitter. The surface receiver may be electrically or optically coupled to the transmitter. The surface receiver may be coupled to the transmitter by electromagnetic telemetry. The surface receiver may be coupled to the transmitter by a pressure transducer. The casing data relay may comprise an antenna coupled to the downhole receiver, the antenna being configured to receive electromagnetic radiation. The casing data relay may comprise one or more casing sensors coupled to the casing, wherein one or more of the one or more casing sensors are coupled to the transmitter. The casing data relay may comprise one or more drill string sensors coupled to a drill string. At least a portion of the drill string may be inserted through the casing. The drill string sensors may be coupled to the downhole receiver. One or more of the drill string sensors may be coupled to the downhole receiver through a drill string transmitter. The casing data relay may comprise drill string instruments coupled to the transmitter and a surface transmitter coupled to the downhole receiver. The casing data relay may comprise a drill string actuator. The drill string actuator may be controllable through the downhole receiver. The drill string actuator may be configured to change a position of an adjustable gauge stabilizer. The drill string actuator may be configured to change a bit nozzle size.

In general, in another aspect, the invention features a method for collecting geological data comprising sensing one or more geological parameters during drilling using one or more sensors coupled to a well casing in a well bore, collecting data from the one or more sensors and transmitting the data to the surface. Sensing may comprise sensing using one or more sensors coupled to a casing shoe, sensing using a pressure transducer on a casing shoe, sensing pressure, sensing temperature, sensing acoustic energy, sensing stress or sensing strain. The method may further comprise transmitting acoustic energy. Transmitting may comprise transmitting the data to the surface through a relay.

In general, in another aspect, the invention features a method for maintaining the integrity of a formation in the vicinity of a casing shoe comprising measuring well bore pressure in the vicinity of the casing shoe during drilling.

Implementations of the invention may include one or more of the following. The method may comprise transmitting data representing the measured well bore pressure to the surface.

In general, in another aspect, the invention features a method for positioning look ahead sensors comprising positioning acoustic sensors along a casing string.

In general, in another aspect, the invention features a method for monitoring well control events comprising monitoring pressure at two or more locations inside a casing of the well.

Implementations of the invention may include one or more of the following. Monitoring may comprise monitoring pressure at two or more locations that are longitudinally displaced along the casing.

In general, in another aspect, the invention features a method for determining whether cement in a well borehole has cured comprising positioning a temperature sensor on a casing and monitoring the temperature of the cement using the temperature sensor.

Implementations of the invention may include one or more of the following. Positioning may comprise positioning the temperature sensor inside the casing or positioning the temperature sensor on the casing shoe.

DESCRIPTION OF THE PREFERRED EMBODIMENTS

An apparatus for monitoring geological. properties and drilling parameters and for facilitating seismic while drilling comprises sensors, actuators and generators coupled to the casing. The sensors allow the collection and transmission to the surface of geological data and critical drilling parameters (such as hydraulic measurements, downhole weight on bit, and downhole torque) from shortly after the casing is inserted until the data is no longer needed. The actuators and generators facilitate the collection of data and are controllable from the surface. The apparatus also provides a relay for data transmitted from deeper in the well bore or from MWD or LWD tools. The equipment relays data between the surface and the sensors, actuators and generators deep in the well.

Figure 1:
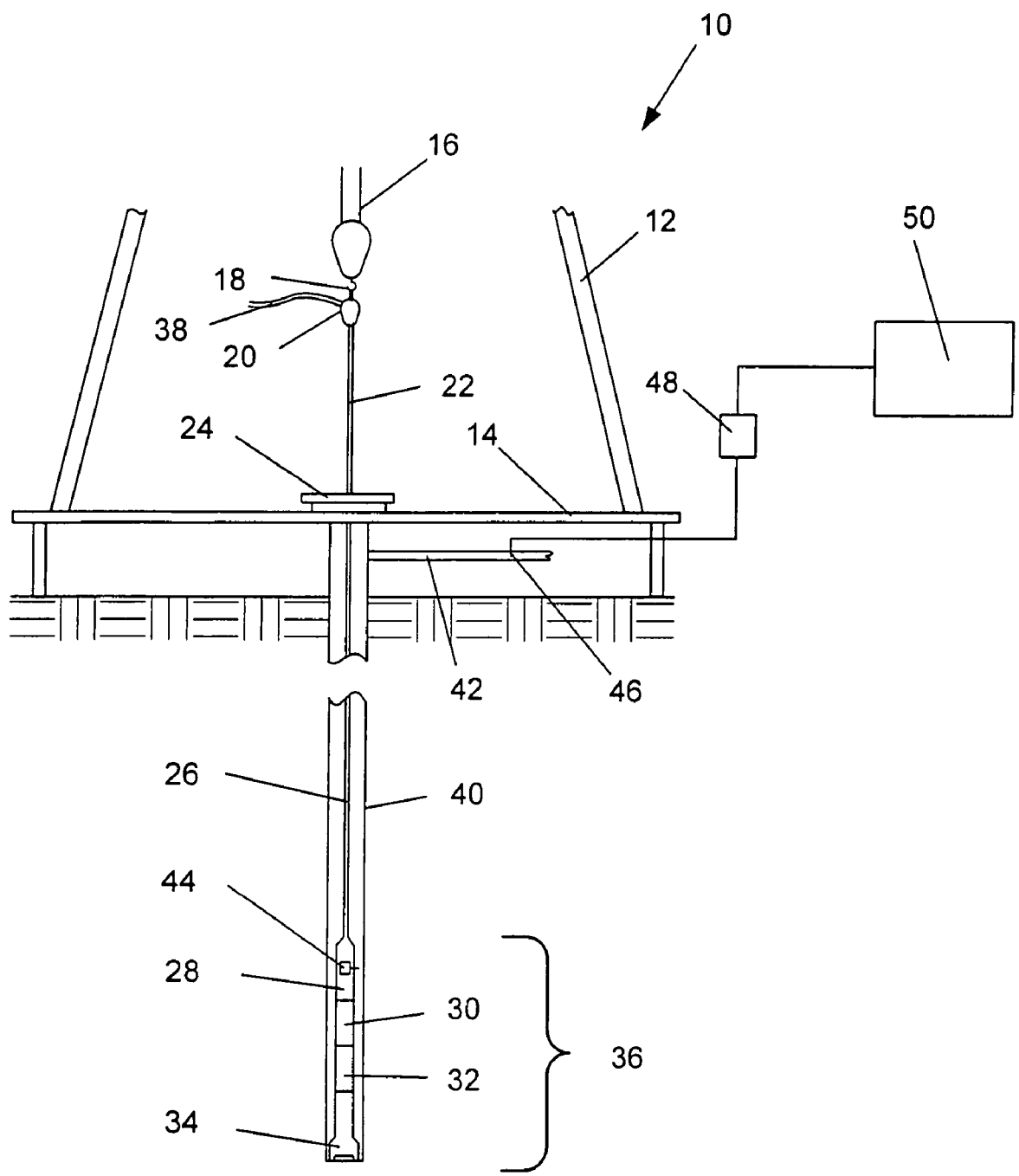
FIG. 1 is a cross-section view of a drilling operation.

As shown in FIG. 1, a drilling rig 10 (simplified to exclude items not important to this application) comprises a derrick 12, derrick floor 14, draw works 16, hook 18, swivel 20, kelly joint 22, rotary table 24, drillstring 26, drill collar 28, LWD tool 30, LWD tool 32 and drill bit 34. Mud is injected into the swivel by a mud supply line 38. The mud travels through the kelly joint 22, drillstring 26, drill collars 28, and LWD tools 30 and 32 and exits through jets or nozzles in the drill bit 34. The mud then flows up the borehole 40. A mud return line 42 returns mud from the borehole 40 and circulates it to a mud pit (not shown) and back to the mud supply line 38. The combination of the drill collar 28, LWD tool 30, LWD tool 32 and drill bit 34 is known as the bottomhole assembly 36 (or "BHA").

The data collected by the LWD tools 30 and 32 is returned to the surface for analysis by, for example, telemetry transmitted through the drilling mud. A telemetry transmitter 44 located in a drill collar or in one of the LWD tools collects data from the LWD tools and modulates the data to transmit it through the mud. A telemetry sensor 46 on the surface detects the telemetry and returns it to a demodulator 48. The demodulator 48 demodulates the data and provides it to computing equipment 50 where the data is analyzed to extract useful information.

Figure 2:
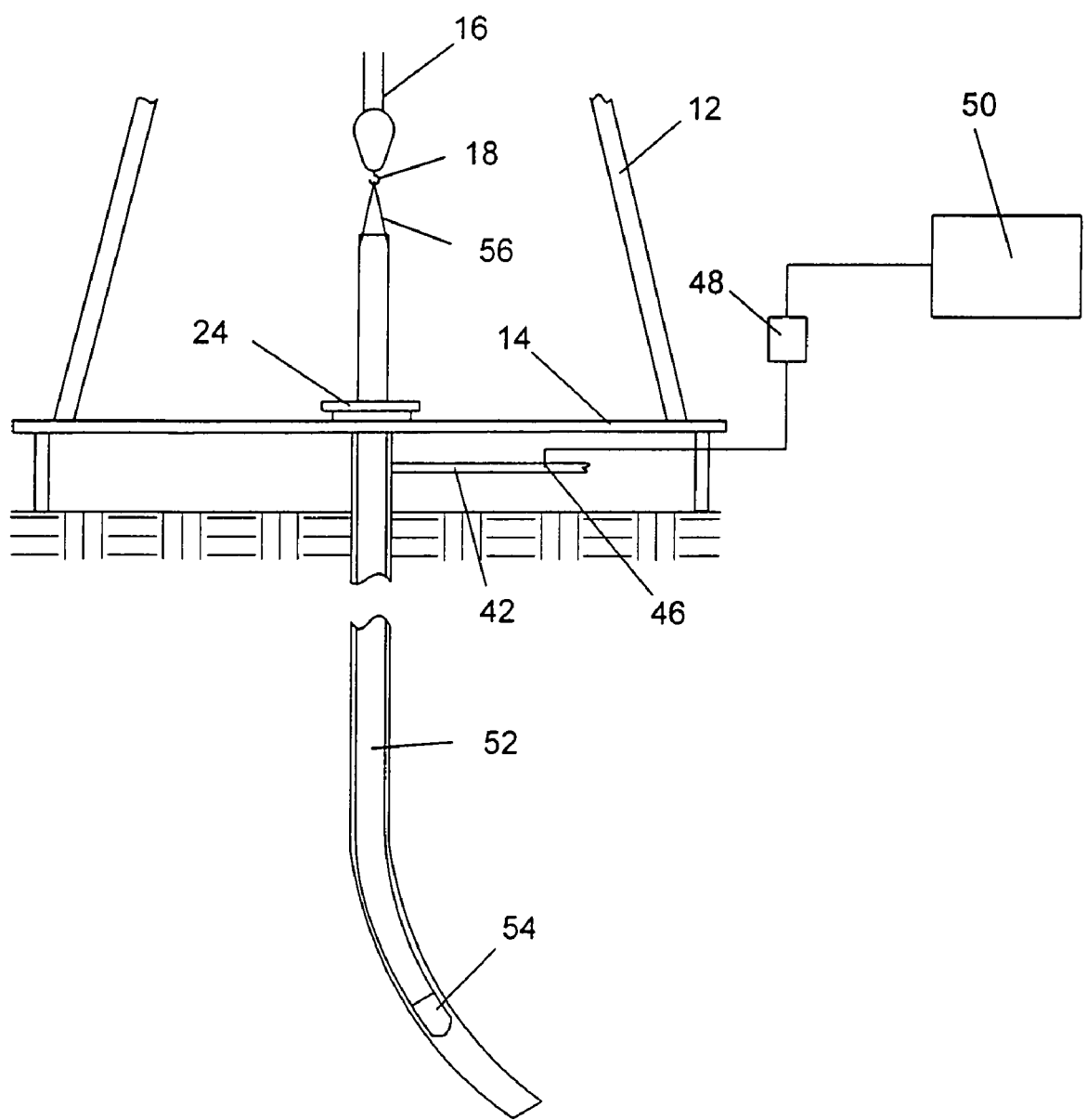
FIG. 2 is a cross-section view of casing being inserted into a well.

After the well has been drilled to a certain depth, has shown in FIG. 2, a length of casing 52 is lowered into the well bore in sections. The first section 54, called a "casing shoe", has a specialized purpose, as will be discussed below. As it is being lowered, the section of casing is suspended from casing hangar 56, which hangs from the hook 18.

Figure 3:
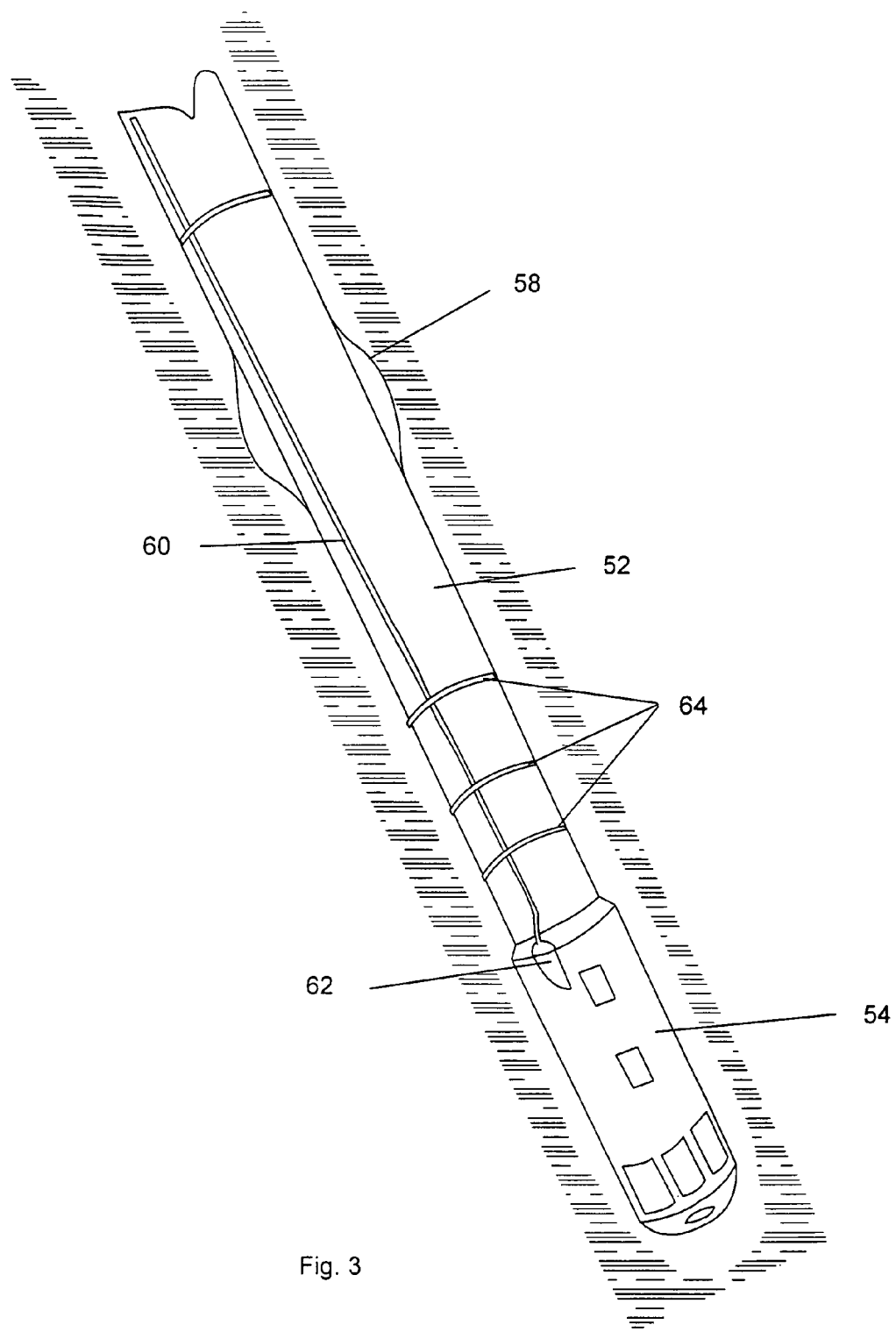
FIG. 3 is a perspective view of a section of casing according to the present invention.

When the casing 52 has been fully inserted into the borehole, as shown in FIG. 3, the casing shoe 54 comes to rest at or near the bottom of the well bore. A centralizer 58 keeps the casing centered in the borehole. Signal-carrying cable 60 connects a cable tie-in 62 to equipment on the surface. The cable 60 and cable tie-in 62 allow a connection between the surface and sensors, actuators and generators in the casing shoe, as will be discussed below. Further, cable 60 provides connections between sensors, actuators and generators located along the casing (not shown in FIG. 3) to the casing shoe 54. Wireline anchor bands 64 secure the cable 60 to the casing.

Figure 4:
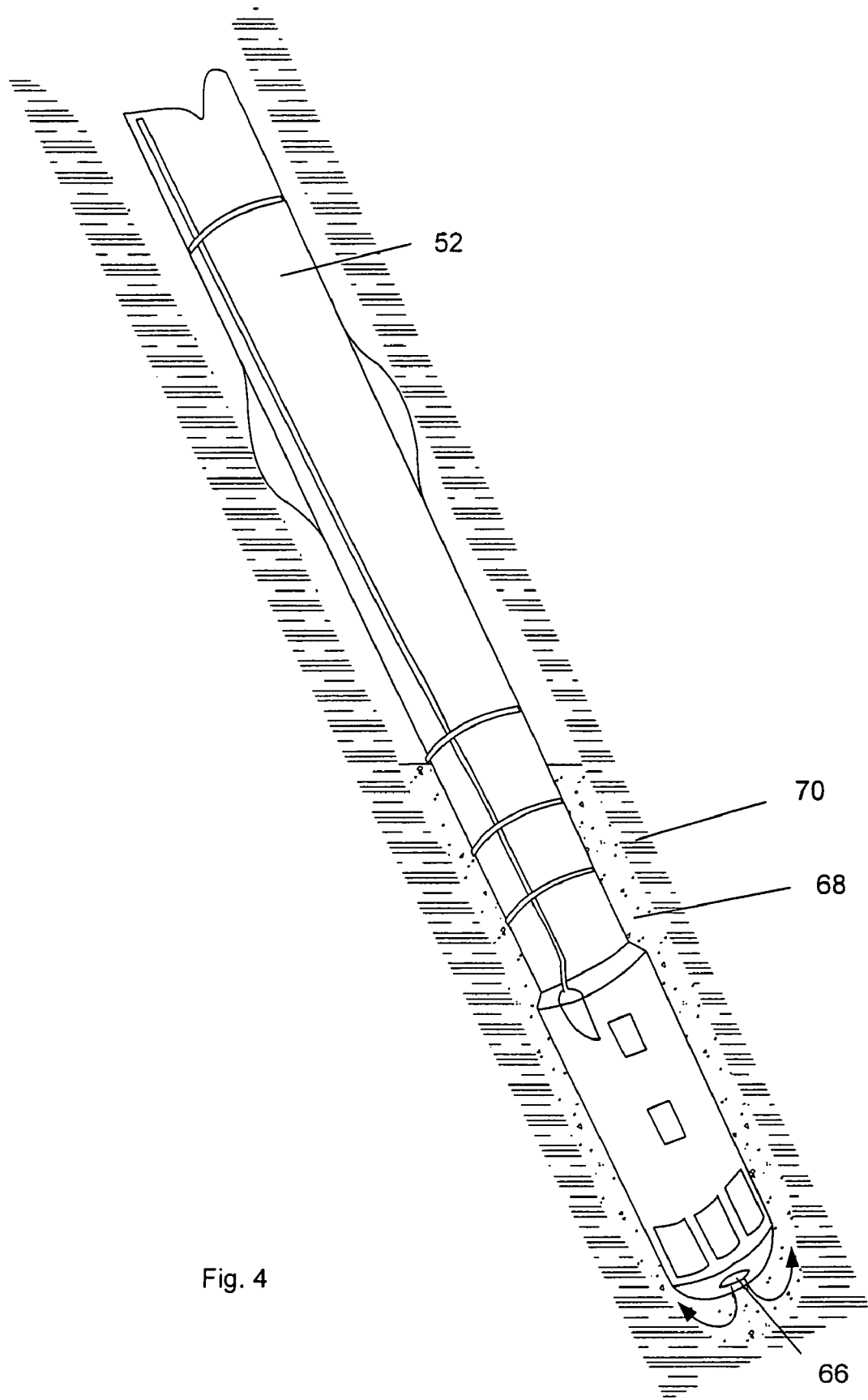
FIG. 4 is a perspective view of a section of casing according to the present invention during the cementing operation.

After the casing is position, it is cemented into place, as shown in FIG. 4. Cement is pumped down through the casing to the casing shoe where it escapes through port 66. The cement 68 flows up the annulus between the casing and the surrounding formations 70.

Figure 5:
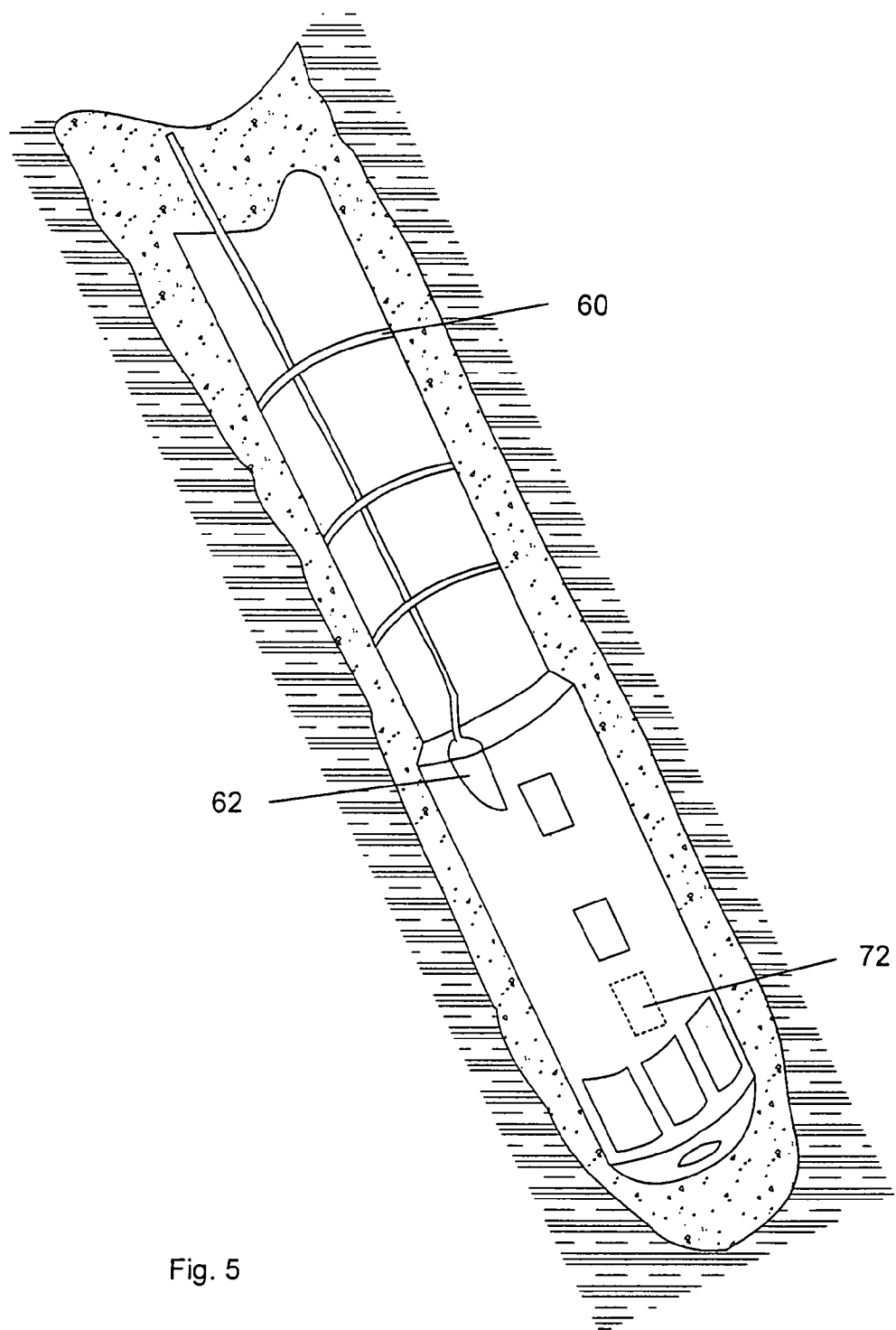
FIG. 5 is a perspective view of a section of casing according to the present invention.

When sufficient concrete has been poured to serve its intended purpose, the concrete is allowed to set, as shown in FIG. 5. As concrete sets, its temperature varies. By monitoring the temperature of the concrete using temperature sensor 72, personnel at the surface can determine when the concrete has set sufficiently to go into the next step in the drilling process. Information from the temperature sensor 72 is transferred to the surface through cable tie-in 62 and cable 60. Additional temperature sensors may be placed at other locations to monitor the temperature of the concrete.

Figure 6:
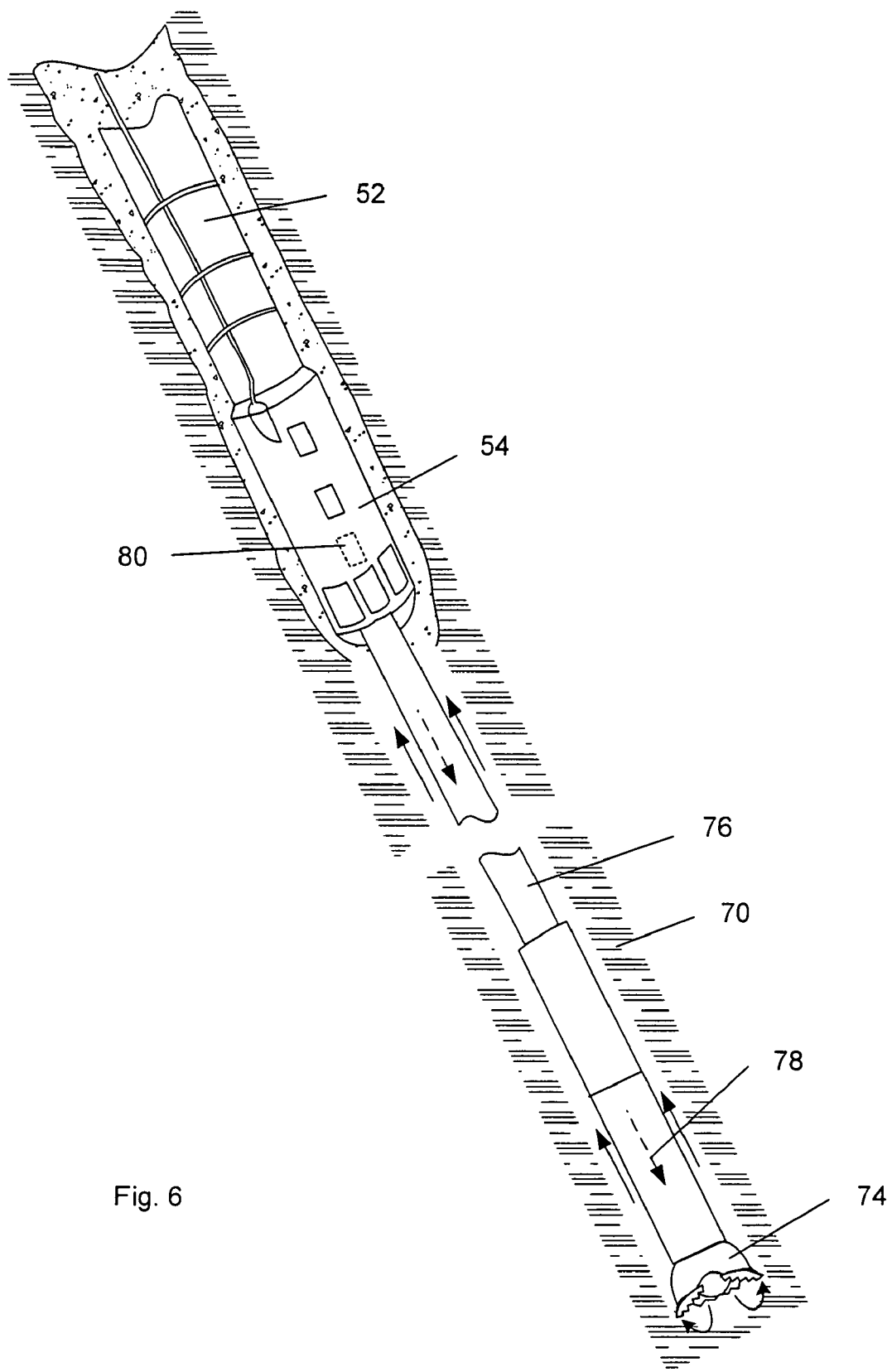
FIG. 6 is a perspective view of a section of casing according to the present invention after drilling has pierced the end of the casing.

The next step in the drilling process, shown in FIG. 6, is to drill out casing 52. Drill bit 74 penetrates the end of casing shoe 54 and continues the well bore. As drilling continues, mud is pumped down through the center of the drillstring 76 and out jets or nozzles in the drill bit 74. The mud 78 picks up cuttings and carries them back to surface along the annulus between the drill string and formation and then along the annulus between the drillstring 76 and casing 52.

As discussed above, the specific gravity of the mud is carefully controlled to assure that the pressure exerted by the mud on the formation does not exceed the fracture pressure of formation. The pressure exerted by the mud on the formation is monitored by a pressure sensor 80 located in the casing shoe. Its location in the casing shoe allows pressure sensor 80 to monitor the pressure on the weakest formation just below the casing shoe.

Personnel on the surface monitor the signals from the pressure sensor, which are sent to the surface through the cable tie-in 62 and cable 60. If they determine that the specific gravity of the mud must be increased because of the danger of a "kick", or influx of formation fluids into the borehole, and the planned increase will raise the pressure exerted by the mud beyond the fracture pressure of the formation, they may decide to stop drilling and insert another section of casing.

In addition to the pressure sensor and temperature sensor that were discussed above, additional sensors are located along the casing to provide a variety of other functions. For example, an array of acoustic sensors and/or geophones may be located along a portion of the casing to receive acoustic energy from the formation through the concrete surrounding the casing. Such acoustic sensors could be used in conjunction with acoustic energy generators located in the MWD tools for accomplishing MWD acoustic logging. The acoustic energy generator could be attached to the casing, allowing long term monitoring of the acoustic characteristics of the formations surrounding the borehole. An acoustic energy generator attached to the casing could also be used as a source for acoustic energy measurements in another nearby well.

Similarly, the acoustic sensors could be used to detect acoustic energy generated by surface generators or by acoustic sources in other nearby wells. The acoustic sensors could be used during drilling and after the well is completed and is in production or after it has been shut in.

Acoustic sensors coupled to the casing can also be used in support of "look-ahead" technology, in which acoustic signals are used to detect geological features ahead of the drill bit. With the acoustic sensors coupled to the casing, the look-ahead performance improves over a look-ahead system employing surface acoustic sensors because the acoustic sensors coupled to the casing are closer to the geological features being detected.

In addition to pressure sensors, temperature sensors and acoustic sensors and generators, stress and strain sensors may be located along the casing to measure the stress and strain to be experienced by the formations surrounding the casing. Again, the stress sensors and strain sensors can be used during drilling and after the well has been completed and has been placed in production or has been shut in.

In another application of sensors, two or more pressure sensors could be strategically located at various depths along the inside of the casing. Such an arrangement of pressure sensors could detect the dynamic changes in pressure associated with a kick. For example, detection of dropping pressure at successively shallower pressure sensors could indicate that a gas kick has occurred. Advance warning of such an event would allow personnel on the surface to engage blowout preventers to reduce the chance of injury to the surface equipment or personnel.

In general, any sensor that provides useful information regarding the formations surrounding the well can be attached to the casing. Further, any actuator or generator that produces useful signals, energy or actions to be used in measuring the properties of the formations or in monitoring the drilling process may also be attached to the casing.

Figure 7:
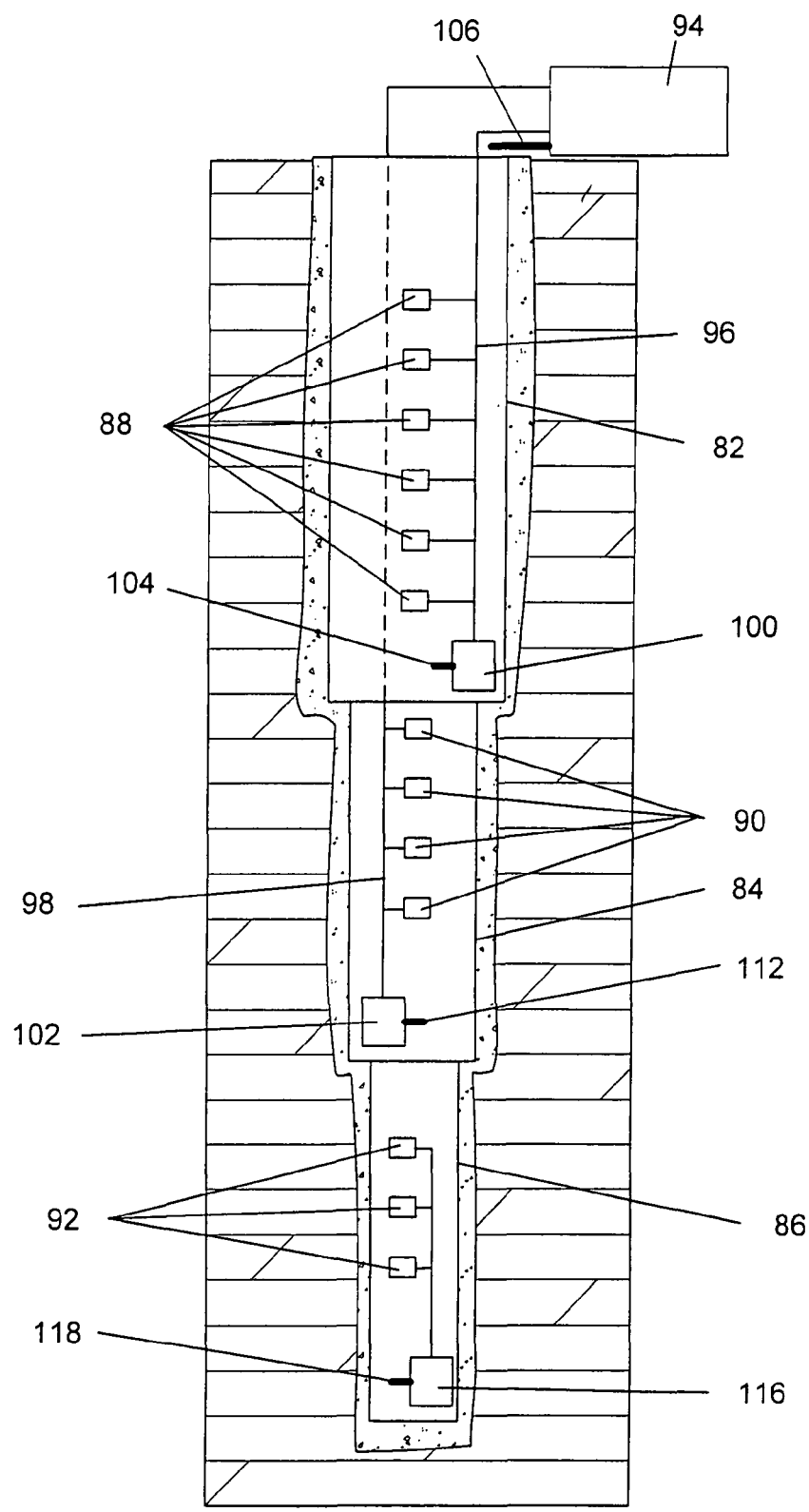
FIG. 7 is a block diagram of a system according to the present invention.

The placement of the sensors, actuators and generators is illustrated in FIG. 7. The well shown in FIG. 7 includes a surface casing 82, an intermediate casing 84, and a drill string 86. A set of surface casing sensors, actuators and generators 88 is coupled to the surface casing 82. A set of intermediate casing sensors, actuators and generators 90 is coupled to the intermediate casing 84. Depending on their purpose, the sensors, actuators and generators may be attached to the inside of the casing or the outside of the casing. The sensors, actuators and generators may be welded to the casing or attached by bands or through special annular fittings that affix them to the inside or the outside of the casing in such a way that they do not interrupt the flow of fluids through or around the casing.

A set of MWD tool sensors, actuators and generators 92 is coupled to the drill string 86. For example, if the MWD tool is an acoustic-logging tool, it would include acoustic energy generators (transmitters) and acoustic energy sensors (receivers). Other types of tools would include other types of sensors and generators. The MWD tool sensors, actuators and generators 92 may provide, for example, the capability to change the position of an adjustable gauge stabilizer or to change the bit nozzle size or to activate any actuator attached to the drill string.

The sensors, actuators and generators communicate with the surface in one or more of several ways. First, each sensor, actuator or generator may have a cable connection to the surface. For example, the surface casing sensors, actuators and generators 88 may communicate with surface equipment 94 via cable 96 and the intermediate casing sensors, actuators and generators 90 may communicate with the surface equipment 94 via cable 98. Alternatively, some or all of the surface casing sensors, actuators and generators 88 may communicate with a surface casing controller 100, coupled to the surface casing 82, which gathers data provided by the surface casing sensors, formats it and communicates it to the surface equipment 94 via cable 98. Surface equipment 94 may transmit commands or other data to the surface casing sensors, actuators and generators 88 directly or through the surface casing controller 100.

Similarly, some or all of the intermediate casing sensors, actuators and generators 90 may communicate with an intermediate casing controller 102, coupled to the intermediate casing 84, which gathers data provided by the intermediate casing sensors, formats it and transmits it to the surface equipment 94. Surface equipment 94 may transmit commands or other data to the intermediate casing sensors, actuators and generators 90 directly or through the intermediate casing controller 102.

Cables 96 and 98 can be any kind of cable, including electrical cable or optical fiber cable. Further, the information carried by the cable can be sent using any information transmission scheme, including baseband, modulated (amplitude modulation, frequency modulation, phase modulation, pulse modulation or any other modulation scheme), and multiplexed (time-division multiplexed, frequency-division multiplexed or any other multiplexing scheme, including the use of spread spectrum techniques). Consequently, each sensor, actuator or generator may communicate with the surface equipment via its own communication media which is part of cables 96 and 98 or each set 88 and 90 may share a communication media that is part of cables 96 and 98, respectively. Further, cables 96 and 98 may be coupled to allow the surface casing sensors, actuators and generators to share the use of the communication medium formed by the combination of the two cables 96 and 98.

Alternatively, communication between the surface casing controller 100 and the surface equipment 94 may be by radio frequency transmission or pulse telemetry transmission. In the case of radio frequency transmission, an antenna 104 extends from the surface casing controller 100 that allows radio frequency communication between it and the surface equipment 94, which would communicate the RF energy via an antenna 106. In the case of pulse telemetry transmission, the surface casing controller 100 and the surface equipment 94 each include a transducer 108 and 110 (see FIG. 8), respectively, that convert data into acoustic pulses and vice versa. The acoustic energy travels through the casing 82, the mud or any other medium that will allow the transmission of acoustic energy. The RF energy and the acoustic energy can be modulated or multiplexed in any of the ways described above. Further, the communication between the surface casing controller 100 and the surface equipment 94 may be done through a combination of communication through the cable, through RF transmission and through pulse telemetry.

Communication between the intermediate casing controller 102 and the surface equipment 94 can be by any of the methods described above for the communication between the surface casing controller 100 and the surface equipment 94. An antenna 112 is coupled to the intermediate casing controller 102 to allow RF communication. An acoustic transducer 114 (see FIG. 8) is coupled to the intermediate casing controller 102 to allow pulse telemetry communication. Alternatively, the surface casing controller 100 can serve as a relay between the intermediate casing controller 102 and the surface equipment 94. In this situation, the intermediate casing controller 102 communicates with the surface casing controller 100 using any of the communication techniques discussed above, including communicating by cable, by RF transmission or by pulse telemetry. The surface casing controller 100 communicates with the surface equipment 94 as discussed above.

The MWD tool sensors, actuators and generators 92 communicate with the surface equipment 94 through a drill string controller 116. The drill string controller 116 compiles data from the MWD tool sensors, actuators and generators 92 and transmits the data to the surface equipment 94. The surface equipment 94 transmits commands and other data to the MWD tool sensors, actuators and generators 92 through the drill string controller 116. The communication between the surface equipment 94 and the drill string controller 116 may be relayed through the intermediate casing controller 102 and the surface casing controller 100. Alternatively, the drill string controller 116 may only use one of the surface casing controller 100 or the intermediate casing controller 102 as a relay. The communication between the drill string controller 116 and the surface equipment 94 may use any of the information transmission schemes described above. An antenna 118 is coupled to the drill string controller 116 to allow RF communication. An acoustic transducer 120 (see FIG. 8) is coupled to the drill string controller 116 to allow pulse telemetry communication.

Figure 8:
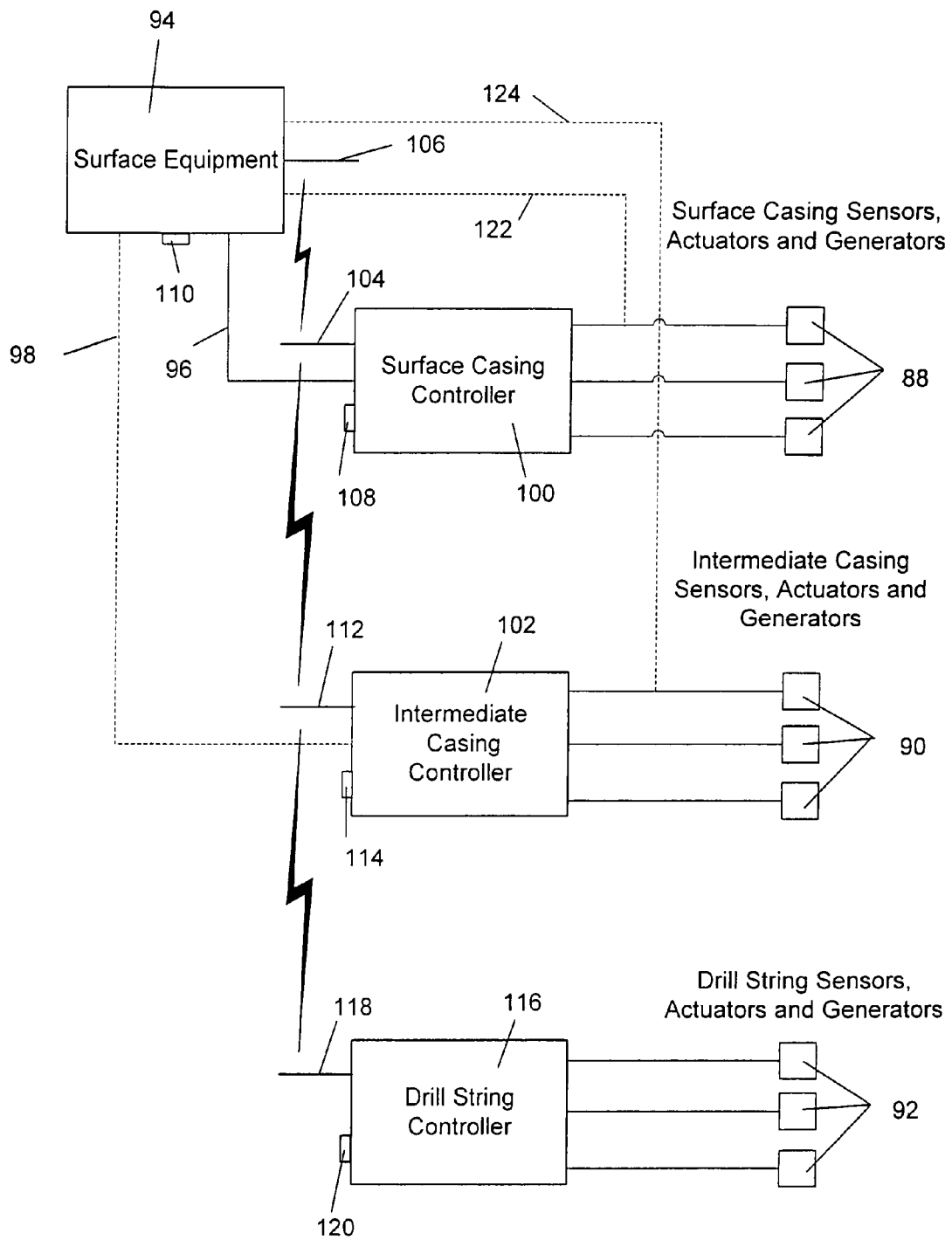
FIG. 8 is a block diagram of a system according to the present invention.

FIG. 8 illustrates all of the communication paths possible among the various sensors, actuators, generators, controllers and surface equipment. In the preferred embodiment, the surface casing sensors, actuators and generators 88 communicate with the surface casing controller 100 which communicates with the surface equipment 94 over cable 96. Alternatively: (a) one or more of the surface casing sensors, actuators and generators 88 may communicate directly with the surface equipment 94, as indicated by dotted line 122; (b) communication between the surface casing controller 100 and the surface equipment 94 may be by RF signals using antennas 104 and 106 or by pulse telemetry using acoustic transducers 108 and 110.

In the preferred embodiment, the intermediate casing sensors, actuators and generators communicate with the intermediate casing controller 102 which communicates with the surface equipment 94 by RF signals using antennas 104 and 112 or by pulse telemetry using acoustic transducers 108 and 114. Alternatively: (a) one or more of the intermediate casing sensors, actuators and generators 90 may communicate directly with the surface equipment 94, as indicated by dotted line 124; (b) communication between the intermediate casing controller 102 and the surface equipment 94 may be by way of cable 98 (shown as a dotted line).

In the preferred embodiment, the drill string sensors, actuators and generators 92 communicate directly with the drill string controller 116, which may be part of an MWD tool or some other piece of drill string equipment. The drill string controller 116 communicates with the surface equipment 94 through antenna 118 and/or acoustic transducer 120 directly or using the intermediate casing controller 102 and/or the surface casing controller 100 as relays.

The foregoing describes preferred embodiments of the invention and is given by way of example only. The invention is not limited to any of the specific features. described herein, but includes all variations thereof within the scope of the appended claims.

What is claimed is:

1. A casing data relay system for use in a wellbore hole, comprising:
   at least one downhole instrument attached to a drill string disposed in the wellbore hole, at least a portion of the drill string being inserted through a well casing disposed in the wellbore hole, said instrument selected from a group consisting of sensors, actuators and generators;
   a first controller attached to a drill string, said controller being coupled to the downhole instrument;
   a second controller attached to a surface of a well casing, said second controller coupled to the first controller by an information transmission scheme; and
   surface equipment coupled to the second controller by an information transmission scheme.

2. The casing data relay system of claim 1 wherein the information transmission scheme connecting the surface equipment and the second controller is an insulated cable.

3. The casing data relay system of claim 1 wherein the information transmission scheme connecting the surface equipment and the second controller is radio frequency transmission.

4. The casing data relay system of claim 1 wherein the information transmission scheme connecting the surface equipment and the second controller is pulse telemetry.

5. The casing data relay system of claim 1 wherein the information transmission scheme connecting the surface equipment and the second controller is electromagnetic telemetry.

6. The casing data relay system of claim 1 wherein the information transmission scheme connecting the surface equipment and the second controller is a fiber optic cable.

7. The casing data relay system of claim 1 wherein the information transmission scheme connecting the first controller and the second controller is electromagnetic telemetry.

8. The casing data relay system of claim 2 wherein the information transmission scheme connecting the first controller and the second controller is electromagnetic telemetry.

9. The casing data relay system of claim 3 wherein the information transmission scheme connecting the first controller and the second controller is electromagnetic telemetry.

10. The casing data relay system of claim 4 wherein the information transmission scheme connecting the first controller and the second controller is electromagnetic telemetry.

11. The casing data relay system of claim 5 wherein the information transmission scheme connecting the first controller and the second controller is electromagnetic telemetry.

12. The casing data relay system of claim 6 wherein the information transmission scheme connecting the first controller and the second controller is electromagnetic telemetry.

* * * * *